Patented Feb. 17, 1948

2,436,143

UNITED STATES PATENT OFFICE 2,436,143

PREPARATION OF FLUOROALKANES

Harvey H. Hoehn, Hockessin, Del., assignor to E. I. du Pont de Nemours & Company, Wilmington, Del., a corporation of Delaware No Drawing. Application July 16, 1946, Serial No. 683,973

14 Claims. (Cl. 260—653)

This invention relates to the manufacture of organic fluorides and more particularly to a new process for the preparation of fluoroalkanes having more than one fluorine atom attached to a terminal carbon atom.

Heretofore fluoroalkanes of this type have been prepared by costly prior art methods. Some of these methods involve replacement of chlorine in chloroalkanes with fluorine by means of selected metallic fluorides either alone or in combination with hydrogen fluoride. Other methods involve fluorination of olefins.

It is an object of this invention to provide a direct method of preparing fluoroalkanes having more than one fluorine atom attached to a terminal carbon atom. A further object of this invention is to provide a new process for the preparation of fluoroalkanes such as 1,1-difluoroalkanes and 1,1,1-trifluoroalkanes. Other objects will appear hereinafter.

These objects are accomplished by the reaction of a fluoroalkane, containing from one to two fluorine atoms attached to a terminal carbon atom which is adjacent to a carbon atom having at least one hydrogen atom attached thereto, with hydrogen fluoride in the presence of a higher oxide of a metal capable of existing in more than one positive valence state. The resulting fluoroalkane contains at least one more fluorine atom on the terminal carbon atom than does the fluoroalkane starting material and can be separated readily from the reaction mixture by fractional distillation. In the process of this invention the entering fluorine atom always attaches itself to the terminal carbon already holding a fluorine atom. Thus the resulting fluoroalkane contains at least two fluorine atoms on the terminal carbon atom.

In the process of this invention there can be used fluoroalkanes having at least one hydrogen atom and at least one fluorine atom attached to a terminal carbon atom adjacent to a carbon atom having at least one hydrogen atom attached thereto. Thus 1-fluoroalkanes and 1,1-difluoroalkanes are included since the terminal carbon atom can contain from one to two fluorine atoms. Fluoroalkanes of this type having from 2 to 4 carbons are preferred because they react readily to yield more highly fluorinated hydrocarbons which are readily separated from the reaction mixture, for example, by low temperature fractionation. Among these fluoroalkanes, 1,1-difluoroethane and 1-fluoroethane are particularly preferred because their use results in unusually high yields of more highly fluorinated ethanes.

Best results are obtained when substantially anhydrous hydrogen fluoride is employed, as any appreciable quantity of water in the reaction system reduces both conversion and yield of the desired products. In general, a temperature in the range of from 30° to 200° C. is employed, and best results are obtained within the range of from 50° to 140° C.

Although fluorination of the terminally substituted fluoroalkanes can occur over a wide range of molar ratios of reactants, it is desirable to use from 0.5 to 15 moles of the metallic oxide and from 2 to 100 moles of hydrogen fluoride per mole of fluoroalkane. Best yields and highest conversions are obtained when from 1 to 5 moles of metallic oxide and from 5 to 25 moles of hydrogen fluoride are used per mole of fluoroalkane.

In a preferred manner of carrying out this invention, the 1-fluoroalkane or 1,1-difluoroalkane, hydrogen fluoride and a strongly oxidizing metallic oxide are heated in a closed system at a temperature of 40° to 150° C. for 2 to 18 hours. The resulting more highly fluorinated terminally substituted products can be separated readily by fractional distillation.

The invention is further illustrated by the following examples in which the parts are given by weight, unless otherwise specified.

*Example I*

A Monel pressure vessel charged to 10% of its capacity with 718 parts of lead dioxide is sealed, cooled in an acetone-Dry Ice bath, and evacuated. After bleeding in 425 parts of substantially anhydrous liquid hydrogen fluoride the reactor is reevacuated and 66 parts of 1,1-difluoroethane is added. The vessel is then rocked slowly and the reactants are heated to a temperature of 125° C. for 8 hours. The vessel is cooled to 60° C. and the gaseous products are passed through a 20% aqueous solution of potassium hydroxide and a column of calcium chloride, and are then collected in a trap cooled in an acetone-Dry Ice mixture. Low temperature fractional distillation of the product (30 parts) yields 25 mole percent of 1,1,1-trifluoroethane, 73 mole percent of recovered 1,1-difluoroethane, and 2 mole percent of unidentified product boiling below −47° C.

*Example II*

A silver-lined pressure vessel charged to 5% of its capacity with 100 parts of chromium trioxide is sealed, cooled in an acetone-Dry Ice mixture, and evacuated. After addition of 160 parts of substantially anhydrous liquid hydrogen fluoride the reactor is evacuated again and 66 parts of 1,1-difluoroethane is added. The pressure vessel is gently rocked and heated so that the reactants are kept at a temperature of 50° C. for 8 hours. The products are then bled off, passed through a 20% aqueous solution of potassium hydroxide, a column of calcium chloride, and collected in a trap cooled in an acetone-Dry Ice mixture. The product consists of 1,1,1-trifluoroethane along with a major proportion of unchanged 1,1-difluoroethane.

Example III

A Monel pressure vessel charged to 5% of its capacity with 261 parts of manganese dioxide is sealed, cooled in an acetone-Dry Ice bath, and evacuated. After addition of 360 parts of substantially anhydrous liquid hydrogen fluoride the reactor is reevacuated and 66 parts of 1,1-difluoroethane is added. The vessel is slowly agitated and heated so that the reactants are maintained at a temperature of 125° C. for 8 hours. The vessel is cooled to 60° C. and the product collected as described in Example I. Examination of the product (43 parts) indicates that it contains a substantial portion of 1,1,1-trifluoroethane along with unreacted 1,1-difluoroethane.

Similar results are obtained when cobaltic oxide is used in place of manganese dioxide in the above experiment.

Example IV

A Monel pressure vessel charged to 10% of its capacity with 718 parts of lead dioxide is cooled in an acetone-Dry Ice bath and evacuated. After addition of 48 parts of 1-fluoroethane the vessel is evacuated again and charged with 360 parts of substantially anhydrous hydrogen fluoride. The reactor is slowly rocked while the contents are heated at 100° C. for 8 hours. After cooling to 60° C., the gaseous product is collected in a trap cooled in an acetone-Dry Ice mixture as described in Example I. Upon low-temperature fractional distillation of the product (15 parts), there are obtained 2.4 mole percent 1,1,1-trifluoroethane, 81.6 mole percent of 1,1-difluoroethane, 14.1 mole percent recovered 1-fluoroethane, and 1.9 mole percent of unidentified material boiling below −64° C. at atmospheric pressure.

Among other fluoroalkanes which can be employed in this invention are 1-fluoro and 1.1-difluoropropane; 1,1-difluorobutane; and 1-fluoro-2-methylpropane. With fluoroalkanes having from five to twenty or more carbon atoms, products are obtained which are more difficult to separate from the reaction mixture.

Any of the higher oxides of metals capable of existing in two or more states of positive valency can be used in the process of this invention. Particularly good results are obtained with higher oxides of manganese, lead, and cobalt, such as $PbO_2$, $MnO_2$ and $Co_2O_3$. Other higher oxides of these metals such as $Pb_3O_4$ and $Mn_2O_7$ can also be used.

The reaction is operable over a wide range of temperatures, the particular temperature employed depending mainly upon the metallic oxide used. For example, while excellent results are obtained with manganese dioxide at 125° C., it is preferable to use a temperature of about 50° C. with chromium trioxide.

The reaction time depends upon the metallic oxide, ratio of reactants, and temperature used, but substantial conversions to more highly fluorinated derivatives are usually obtained in 1 to 24 hours. An increase in time in reactions involving 1-fluoroalkanes favors a higher 1,1,1-trifluoroalkane to 1,1-difluoroalkane ratio.

The products of this invention, 1,1-difluoroalkanes and 1,1,1-trifluoroalkanes are useful as intermediates in the preparation of unsaturated fluorides, such as vinyl fluoride and vinylidene fluoride which can be polymerized to yield desirable polymers. The products of this invention can also be used as ingredients of insecticide compositions or as refrigerants.

As many apparently widely different embodiments of this invention may be made without departing from the spirit and scope thereof, it is to be understood that I do not limit myself to the specific embodiments thereof except as defined in the appended claims.

I claim:

1. A process for the preparation of fluoroalkanes having at least two fluorine atoms attached to a terminal carbon atom, which comprises reacting a fluoroalkane, having at least one hydrogen atom and at least one fluorine atom attached to a terminal carbon atom adjacent to a carbon atom having at least one hydrogen atom attached thereto, with hydrogen fluoride in the presence of a higher oxide of a metal capable of existing in more than one positive valence state.

2. A process for the preparation of fluoroalkanes having at least two fluorine atoms attached to a terminal carbon atom, which comprises reacting a 1-fluoroalkane, wherein the terminal carbon atom containing the single fluorine atom is adjacent to a carbon atom having at least one hydrogen atom attached thereto, with hydrogen fluoride in the presence of a higher oxide of a metal capable of existing in more than one positive valence state.

3. A process for the preparation of 1,1,1-trifluoroalkanes which comprises reacting a 1,1-difluoroalkane, wherein the terminal carbon atom containing the two fluorine atoms is adjacent to a carbon atom having at least one hydrogen atom attached thereto, with hydrogen fluoride in the presence of a higher oxide of a metal capable of existing in more than one positive valence state.

4. A process for the preparation of fluoroalkanes having at least two fluorine atoms attached to a terminal carbon atom, which comprises reacting a fluoroalkane, containing from 2 to 4 carbon atoms and having at least one hydrogen atom and at least one fluorine atom attached to a terminal carbon atom adjacent to a carbon atom having at least one hydrogen atom attached thereto, with hydrogen fluoride in the presence of a higher oxide of a metal capable of existing in more than one positive valence state.

5. A process for the preparation of fluoroethanes having at least two fluorine atoms attached to a terminal carbon atom, which comprises reacting 1-fluoroethane with hydrogen fluoride in the presence of a higher oxide of a metal capable of existing in more than one positive valence state.

6. A process for the preparation of 1,1,1-trifluoroethane which comprises reacting 1,1-difluoroethane with hydrogen fluoride in the presence of a higher oxide of a metal capable of existing in more than one positive valence state.

7. A process for the preparation of fluoroalkanes having at least two fluorine atoms attached to a terminal carbon atom, which comprises reacting one molar equivalent of a fluoroalkane, having at least one hydrogen atom and at least one fluorine atom attached to a terminal carbon atom adjacent to a carbon atom having at least one hydrogen atom attached thereto, with from 2 to 100 molar equivalents of hydrogen fluoride in the presence of 0.5 to 15 molar equivalents of a higher oxide of a metal capable of existing in more than one positive valence state.

8. A process as set forth in claim 1 in which the reaction is carried out at a temperature from 30° to 200° C.

9. A process as set forth in claim 1 in which the reaction is carried out at a temperature from 40° to 150° C.

10. A process for the preparation of fluoroalkanes having at least two fluorine atoms attached to a terminal carbon atom, which comprises reacting a fluoroalkane, having at least one hydrogen atom and at least one fluorine atom attached to a terminal carbon atom adjacent to a carbon atom having at least one hydrogen atom attached thereto, with hydrogen fluoride in the presence of a higher oxide of lead.

11. A process for the preparation of fluoroalkanes having at least two fluorine atoms attached to a terminal carbon atom, which comprises reacting a fluoroalkane, having at least one hydrogen atom and at least one fluorine atom attached to a terminal carbon atom adjacent to a carbon atom having at least one hydrogen atom attached thereto, with hydrogen fluoride in the presence of a higher oxide of manganese.

12. A process for the preparation of fluoroalkanes having at least two fluorine atoms attached to a terminal carbon atom, which comprises reacting a fluoroalkane, having at least one hydrogen atom and at least one fluorine atom attached to a terminal carbon atom adjacent to a carbon atom having at least one hydrogen atom attached thereto, with hydrogen fluoride in the presence of a higher oxide of cobalt.

13. A process for the preparation of 1,1-difluoroethane which comprises reacting 1-fluoroethane with hydrogen fluoride in the presence of a higher oxide of a metal capable of existing in more than one positive valence state.

14. A process for the preparation of 1,1,1-trifluoroethane which comprises reacting 1,1-difluoroethane with substantially anhydrous hydrogen fluoride at a temperature of 40° to 150° C. in the presence of lead dioxide.

HARVEY H. HOEHN.

REFERENCES CITED

The following references are of record in the file of this patent:

UNITED STATES PATENTS

| Number | Name | Date |
|---|---|---|
| 2,005,707 | Daudt et al. | June 18, 1935 |
| 2,146,354 | Scherer | Feb. 7, 1939 |